Dec. 18, 1934.     V. A. NOTTOLI     1,984,694
SPRING SUSPENSION FOR VEHICLE WHEELS
Filed Sept. 18, 1933     4 Sheets-Sheet 1
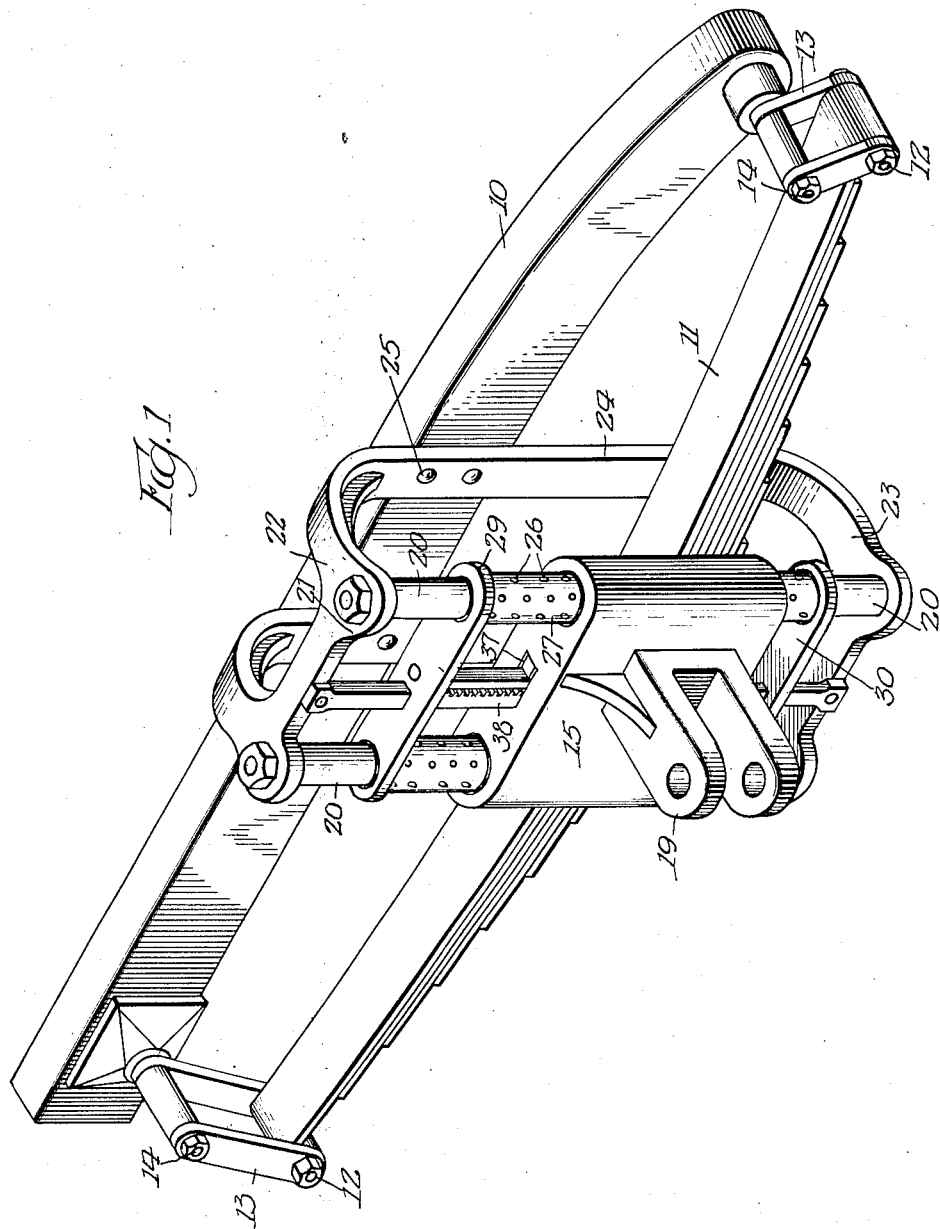
INVENTOR.
Victor A. Nottoli
BY Fred Gerlach
his ATTORNEY.

Dec. 18, 1934.   V. A. NOTTOLI   1,984,694
SPRING SUSPENSION FOR VEHICLE WHEELS
Filed Sept. 18, 1933   4 Sheets-Sheet 2
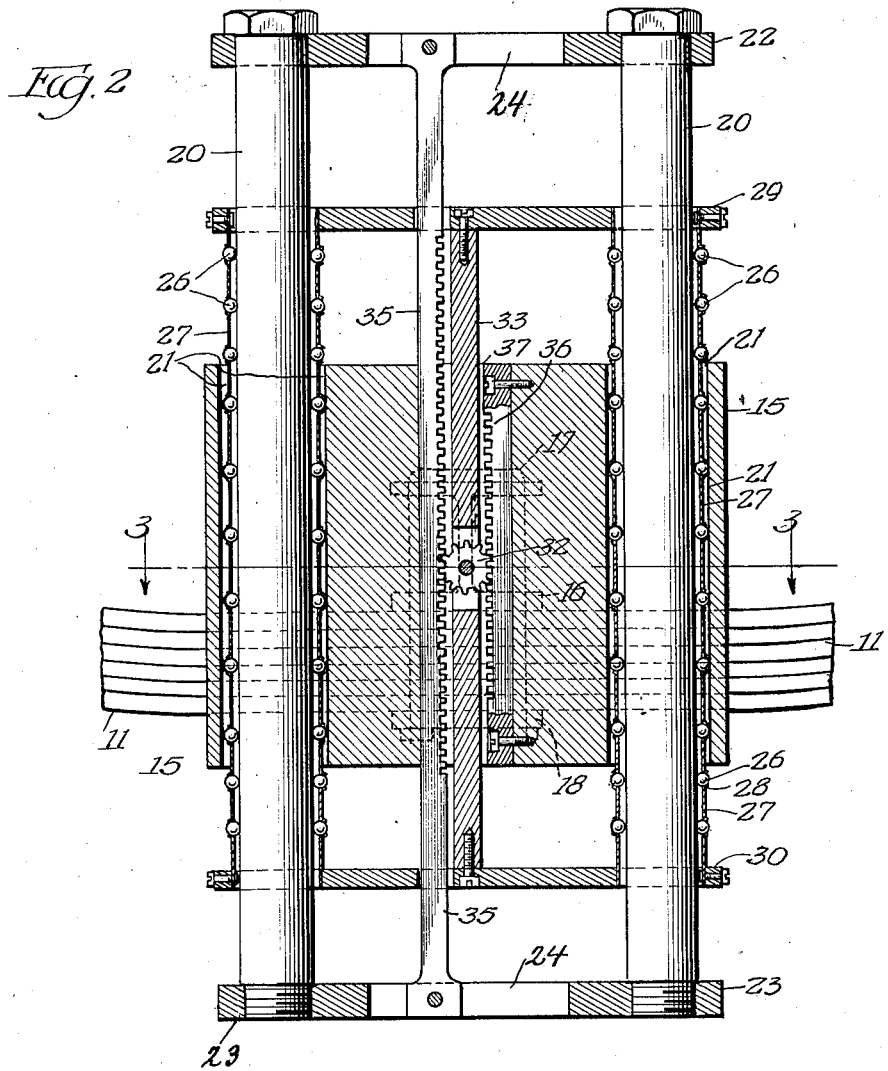
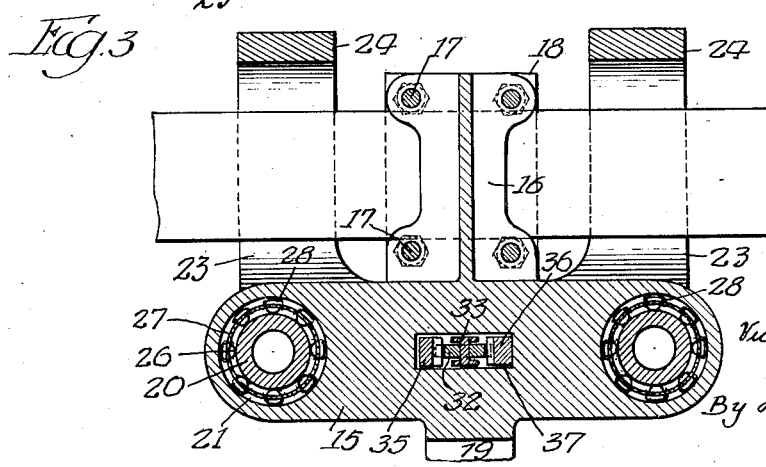
INVENTOR.
Victor A. Nottoli
By Fred Gerlach
ATTORNEY.

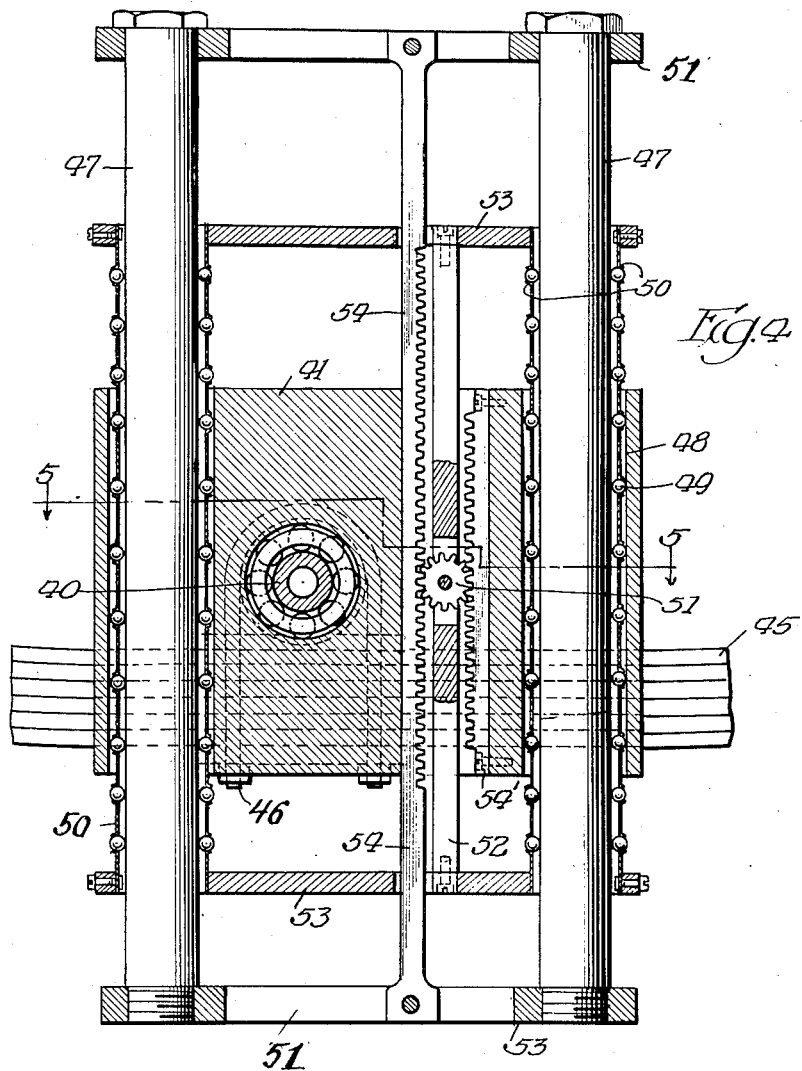

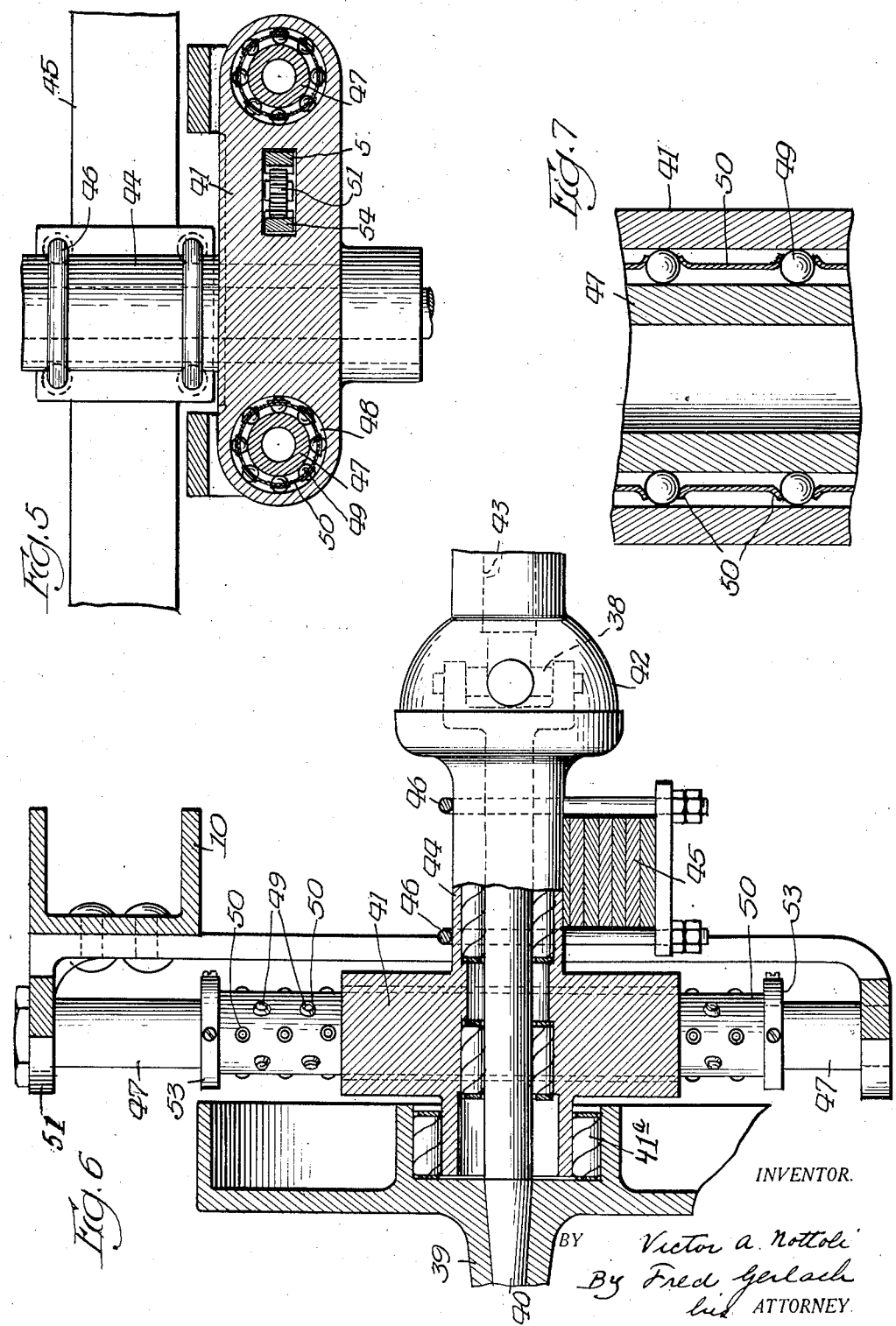

Patented Dec. 18, 1934

1,984,694

UNITED STATES PATENT OFFICE 1,984,694

SPRING SUSPENSION FOR VEHICLE WHEELS

Victor A. Nottoli, Chicago, Ill.

Application September 18, 1933, Serial No. 689,804

12 Claims. (Cl. 267—68)

The invention relates generally to spring suspensions for vehicle wheels. More particularly the invention relates to that type of spring suspension which comprises substantially horizontal leaf springs which are attached to the chassis frame to move vertically relatively to the running and traction wheels.

One object of the invention is to provide a spring suspension of this type having novel and improved guide means for preventing relative fore-and-aft movement between the wheels and the frame so that the maximum cushioning effect of the springs will be retained.

By utilizing the improved guide means in the spring suspension the vertical spring action will not be impaired and the fore-and-aft relation between the wheels and the frame will not change during the flexing of the springs, and this will cause the vehicle to which the spring suspension is applied to ride more evenly over rough roads or obstructions. The starting, stopping, and propelling forces will not be applied through or act on the springs and this will tend to lessen spring breakage resulting from relative fore-and-aft movement of the frame and wheels.

Another object of the invention is the provision of simple and efficient anti-friction means for the guide-means of the spring suspension whereby the action of the springs will not be retarded.

Other objects of the invention and the various advantages and characteristics of the present spring suspension will be apparent from a consideration of the following detailed description.

The invention consists in the several novel features which are hereinafter set forth and are more particularly defined by claims at the conclusion hereof.

In the drawings which accompany and form a part of the present description or specification and in which like numerals of reference denote corresponding parts throughout the several views, Figure 1 is a perspective of that part of a vehicle spring suspension embodying the invention which is applied to one of the front or steering wheels of the vehicle. Fig. 2 is a vertical longitudinal section through the guide-means or unit of the structure shown in Fig. 1. Fig. 3 is a horizontal section on line 3—3 of Fig. 2. Fig. 4 is a vertical section through the guide-means of that part of the spring suspension which is applied to the driving axle of one of the driving or traction wheels of the vehicle with which the spring suspension is associated. Fig. 5 is a horizontal longitudinal section through the guide unit of the structure shown in Fig. 4. Fig. 6 is a vertical section of the structure shown in Fig. 5. Fig. 7 is a detail section on an enlarged scale showing the construction of the anti-friction bearings of the guide-units of the spring suspension.

The spring suspension which forms the subject matter of the invention is designed primarily for use with vehicles of the automobile type and serves as an instrumentality for supporting the chassis frame of the vehicle with respect to the wheels. The numeral 10 designates the side members of the chassis frame of the vehicle to which the spring suspension is applied. In Figs. 1, 2 and 3 of the drawings, the part of the spring suspension which is associated with one of the steering wheels of the vehicles is shown. This part comprises a leaf spring 11 which is of usual construction and has the ends thereof pivotally connected to the frame by means of pins 12. The latter are mounted in the lower ends of shackles 13 suspended from pins 14 on the vehicle frame. The central portion of the leaf spring 11 is free to move vertically and the shackles permit the ends of the spring to be extended as the leaf spring is flattened or bent.

A bracket 15 at the outer side of the spring is provided with an integral inwardly extending arm or lug 16 to the underside of which the central portion of the leaf spring is fixedly secured by U-bolts 17 and plates 18 which are clamped against the underside of the spring by the nuts on the U-bolts, to support the spring from the wheel. This bracket 15 is supported from, and connected to, one of the wheels (not shown), usually by means of a fork 19 in which the pivoted axle of the steering wheel is mounted, as well understood in the art.

Bracket 15 is guided to move in a vertical rectilinear path relatively to the frame, so as to prevent relative fore-and-aft movement, and so the bracket will be connected for conjoint horizontal movement, independently of the leaf spring. For this purpose, a pair of tubular guide rods 20 which are secured to move with the frame, extend vertically through cylindrical openings or sockets 21 in the bracket 15. These rods are fixed in a bracket 24 which is fixed to the frame 10. The lower ends of said rods are fixedly secured by screw threads to the lower arms 23 of bracket 24 and the upper ends of these rods extend through arms 22 on said bracket. The arms 22, 23 project outwardly from the vehicle frame and are vertically spaced from the bracket 15 sufficiently to permit the latter to move vertically as the spring 11 yields or flexes. It is desirable to minimize the friction between the bracket 15 and the guide rods 20, so as not to interfere with the action of the leaf spring and for this purpose a series of bearing balls 26 are provided between each guide rod 20 and the wall around the hole 21 in the bracket 15 through which the rod slides vertically. The balls 26 of each series are held in spaced apart relation by a cylindrical cage 27 in which the balls are retained by flanges 28 around openings in the cage through which the outer portions of the balls project.

The ball-cages 27 are secured together at their upper and lower ends by cross bars 29 and 30 above and below the bracket 15 for conjoint vertical rectilinear movement. To guide and maintain the bearing balls in proper operative relation to the bracket, the vertical movement of the cages responsively to the rolling action of the balls is controlled by a pinion 32 which is pivotally mounted in a vertical bar 33 which is fixed to the cross bars 29 and 30 which connect the cages. This pinion meshes at one side with a vertical rack 35 which has its upper and lower ends fixed to the bracket 24 which is fixed to the vehicle frame and at its other side with a rack 36 which is secured to one side of a vertical opening 37 which extends through bracket 15. The relative vertical movement between the vehicle-frame and the bracket 15 will rotate pinion 32 and control the vertical position, and equalize the travel, of the cages 27 and always maintain the bearing balls 26 properly positioned vertically for anti-frictionally guiding the rods 20 in the bracket 15.

In the operation of the construction described, whenever the vehicle is subjected to shock to be absorbed by the spring so relative vertical movement between the vehicle-frame and the wheels occurs, guide-rods 20 which move with the frame will slide vertically in the bracket 15 responsively to any flexing of the spring. There will be no relative fore-and-aft movement between the central portion of the spring or the bracket 15 which is supported by the wheel and its axle. The anti-friction bearing between the vertical guide rods 20 and the bracket 15 will prevent any cramping between the rods and the bracket which would impair or retard the action of the spring 11. By preventing this relative fore-and-aft movement, the frame will be more efficiently cushioned by the spring 11, the wheels do not change their fore-and-aft position relatively to the frame, and the starting, stopping, driving forces are not transmitted through the springs, and the breakage of the spring sometimes caused by the fore-and-aft stresses, is avoided.

The part of the spring suspension which is shown in Figs. 4 to 7 is associated with the axle section 40 for driving one of the traction wheels 39 of vehicle. This axle section is journaled in a bracket 41 which supports a leaf spring 45. The inner end of this axle section is driven through a universal joint 38, of any suitable construction, contained in a housing 42 and driven in any suitable manner from the axle section 43 by gearing mounted on the vehicle frame in any manner as usual in the art.

The bracket 41 carries a bearing 41ª for the wheel 39 and has an inwardly projecting hub 44 to which the central portion of the leaf spring 45 is clamped by U-bolts 46. Cylindrical guide rods 47 which extend through holes 48 in the bracket 41 have their upper and lower ends fixedly secured in arms projecting outwardly from bracket 51 which is fixedly secured to the vehicle frame 10. Each series of bearing balls 49 between the bracket 41 and rods 47 respectively, is confined in a cage 50, to anti-frictionally guide the rods in said bracket. The vertical movement of the cages and balls is controlled in the same manner as described in Figs. 1 and 3 construction, by a pinion 51 which is carried by a bar 52 which is fixed to cross bars 53 between the cages 50, a rack 54 fixed to bracket 41 on the vehicle frame and a rack 54' fixed in the bracket 41 and meshing with the teeth at the other side of said pinion.

The operation of this construction is similar to that already described in connection with Figs. 1 to 3. An additional advantage in applying the invention between a traction wheel and the vehicle frame is that the driving stresses are transmitted to the frame through the vertical guide-means, independently of the spring 45, while the latter permits the desired up and down movements of the frame to properly cushion the vehicle.

While the invention has been illustrated as applied to one front and one steering wheel and one traction wheel, it will be understood that it will be applied to both front and both steering wheels, but since the constructions for the front and rear wheel respectively, are identical, it has not been deemed necessary to illustrate and describe the invention as applied to all of the wheels.

The invention is not to be understood as restricted to the details described since these may be modified within the scope of the appended claims without departing from the spirit and scope of the invention.

Having thus described the invention, what I claim as new and desire to secure by Letters Patent, is:

1. In a wheeled vehicle, the combination of a frame, a substantially horizontal leaf spring having its ends movably connected to the frame, a bracket adapted to be supported by one of the wheels and secured to the central portion of the spring, and guide-means between said bracket and the frame for permitting vertical rectilinear relative movement between the bracket and the frame and for connecting the bracket and the frame for conjoint relative fore-and-aft movement, said means comprising a vertical rod carried by the frame and extending through, and slidable in, a vertical socket in the bracket on the central portion of the spring.

2. In a wheeled vehicle, the combination of a frame, a substantially horizontal leaf spring having its ends movably connected to the frame, a bracket adapted to be supported by one of the vehicle wheels and secured fixedly against one side of the central portion of the spring, and guide-means between the frame and the bracket for permitting vertical rectilinear relative movement between the bracket and the frame and for connecting the bracket and the frame for conjoint relative fore-and-aft movement, said guide-means comprising a pair of vertical laterally spaced rods carried by the frame and extending through, and slidable in, a pair of vertical laterally spaced sockets in the bracket in the central portion of the spring.

3. In a wheeled vehicle, the combination of a frame, a leaf spring having its ends movably connected to the frame, a bracket adapted to be supported by one of the vehicle wheels and secured fixedly against one side of the central portion of the spring, and a guide-unit between the frame and the bracket for permitting vertical rectilinear relative movement between the bracket and the frame and for connecting the bracket and the frame for conjoint relative fore-and-aft movement, said unit comprising an elongated bracket on said frame extending vertically alongside of the other side of the central portion of the spring and having arms at its upper and lower ends extending respectively over and under the spring and projecting beyond said one side of the spring, and a vertical guide-rod extending between and carried by the outer ends of the arms on the last mentioned bracket and extending through, and slidable in a vertical socket in the first mentioned bracket.

4. In a wheeled vehicle, the combination of a frame, a substantially horizontal leaf spring having its ends movably connected to the frame, a bracket adapted to be supported by one of the vehicle wheels and secured fixedly against one side of the central portion of the spring, and a guide-unit between the frame and said bracket for permitting vertical rectilinear relative movement between the bracket and the frame and for connecting the bracket and the frame for conjoint fore-and-aft movement, said unit comprising an elongated bracket on said frame extending vertically alongside of the other side of the central portion of the spring and having the upper and lower ends thereof bent outwardly to form pairs of arms which overlie and underlie the spring respectively and project beyond said one side of the spring, and a pair of rods carried vertically by the pairs of arms and extending through, and slidable in, vertical sockets in the first mentioned bracket.

5. In a wheeled vehicle, the combination of a chassis frame comprising a side member, a substantially horizontal leaf spring having its ends movably connected to the side-member of the frame, a bracket-member adapted to be supported by one of the vehicle wheels and rigidly secured to the central portion of the spring, and guide-means for permitting vertical rectilinear relative movement between the bracket-member and said frame and connecting the bracket-member and the frame for conjoint relative fore-and-aft movement, said means comprising a vertical rod carried by one of the members and extending through, and slidable in, a vertical cylindrical socket in the other member and anti-friction elements between the socket forming portion of said other member and the rod.

6. In a wheeled vehicle, the combination of a frame, a leaf spring having its ends movably connected to the frame, a bracket adapted to be supported by one of the vehicle wheels and rigidly secured to the central portion of the spring, and guide-means for permitting vertical rectilinear relative movement between the bracket and the frame and connecting the bracket and the frame for conjoint relative fore-and-aft movement, said means comprising elements fixed to move with the frame and bracket respectively, and anti-friction bearings between said elements comprising balls and cages for controlling the vertical position of the balls.

7. In a wheeled vehicle, the combination of a frame, a substantially horizontal leaf spring having its ends movably connected to the frame, a bracket adapted to be supported by one of the vehicle wheels and rigidly secured to the central portion of the spring, and a guide-unit between the frame and the bracket for permitting vertical rectilinear relative movement between the bracket and the frame and for connecting the bracket and the frame for conjoint relative fore-and-aft movement, said unit comprising vertical rods carried by the frame and extending through, and slidable in, vertical sockets in said bracket, and anti-friction bearings in the sockets in the bracket and applied to the guide rods.

8. In a wheeled vehicle, the combination of a frame, a leaf spring having its ends movably connected to the frame, a bracket adapted to be supported by one of the vehicle wheels and rigidly secured to the central portion of the spring, and a guide-unit between the frame and the bracket for permitting vertical rectilinear relative movement between the bracket and the frame and for connecting the bracket and the frame for conjoint relative fore-and-aft movement, the unit comprising a pair of guide-rods, a bracket secured to the frame and in which said rods are secured, anti-friction balls between the first mentioned bracket and the guide rods, and vertically movable cages for the balls.

9. In a wheeled vehicle, the combination of a frame, a leaf spring having its ends movably connected to the frame, a bracket adapted to be supported by one of the vehicle wheels and rigidly secured to the central portion of the spring, and guide means between the frame and the bracket for permitting vertical rectilinear relative movement between them and for connecting the bracket and the frame for conjoint relative fore-and-aft movement, said means comprising elements movable vertically with the bracket and the frame respectively, bearing balls between said elements and means for controlling the vertical movement of the balls responsively to the relative vertical movement of said elements.

10. In a wheeled vehicle, the combination of a frame, a leaf spring having its ends movably connected to the frame, a bracket adapted to be supported by one of the vehicle wheels and rigidly secured to the central portion of the spring, and guide means between the frame and the bracket for permitting vertical rectilinear relative movement between them and for connecting the bracket and the frame for conjoint relative fore-and-aft movement, said means comprising elements movable vertically with the bracket and the frame respectively, bearing balls between said elements and means for controlling the vertical movement of the balls responsively to the relative vertical movement of said elements comprising a pinion and racks secured to said elements respectively.

11. In a wheeled vehicle, the combination of a frame, a leaf spring having its ends movably connected to the frame, a bracket adapted to be supported by one of the vehicle wheels and rigidly secured to the central portion of the spring, and guide means between the bracket and the frame for permitting vertical rectilinear relative movement between them and for connecting the bracket and the frame for conjoint relative fore-and-aft movement, said guide-means comprising a pair of guide-rods movable through said bracket, bearing balls between the bracket and the guide rods, and means for controlling the vertical movement of the balls for both guide-rods.

12. In a wheeled vehicle, the combination of a frame, a leaf spring having its ends movably connected to the frame, a bracket adapted to be supported by one of the vehicle wheels and rigidly secured to the central portion of the spring, and guide means between the bracket and the frame for permitting vertical rectilinear relative movement between them and for connecting the bracket and the frame for conjoint relative fore-and-aft movement, said guide-means comprising a pair of guide-rods movable through said bracket, bearing balls between the bracket and the guide rods, and means for controlling the vertical movement of the balls for both guide-rods comprising a pinion, and racks secured to move vertically with the bracket and frame respectively.

VICTOR A. NOTTOLI.